S. E. JERALDS.
Ferrules.
No. 145,950.  Patented Dec. 30, 1873.
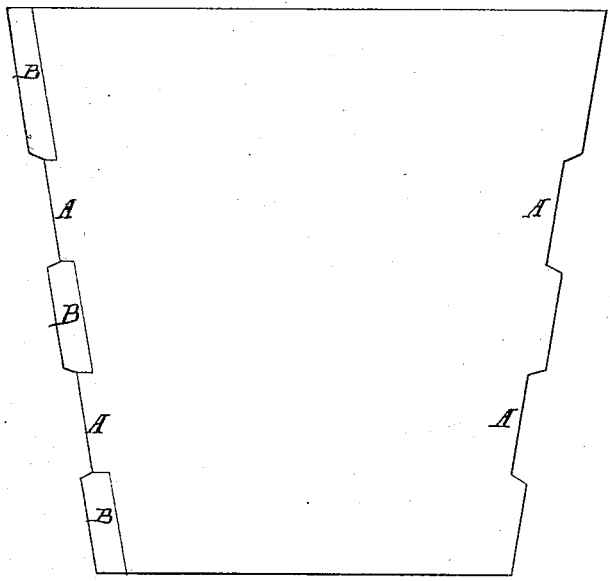
Fig: 1.
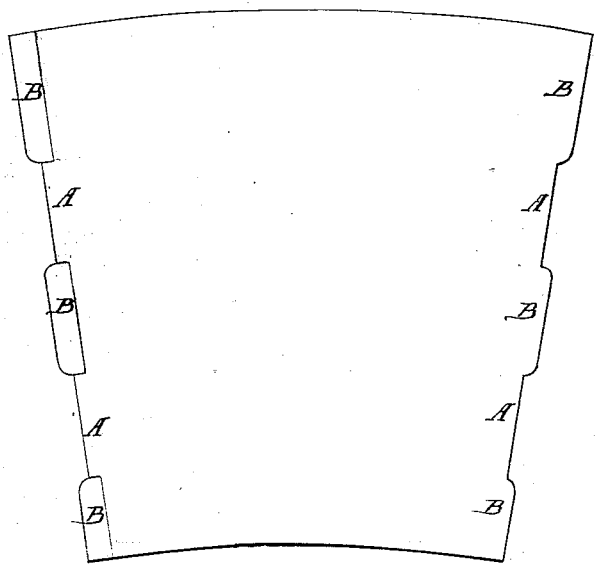
Fig: 2.
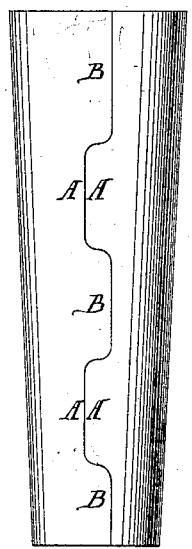
Fig: 3.
Witnesses:
Philip M. Shuey
G. W. Browne
Inventor:
Silas E. Jeralds
per Fisher & Duncan
attys

UNITED STATES PATENT OFFICE.

SILAS E. JERALDS, OF CHESHIRE, CONNECTICUT, ASSIGNOR OF ONE-HALF HIS RIGHT TO EDWIN R. LAWTON.

IMPROVEMENT IN FERRULES.

Specification forming part of Letters Patent No. 145,950, dated December 30, 1873; application filed October 9, 1873.

*To all whom it may concern:*

Be it known that I, SILAS E. JERALDS, of Cheshire, in the county of New Haven and State of Connecticut, have invented a certain Improvement in Ferrules, of which the following is a specification:

My invention consists of a ferrule or other similar article, having its joint formed partly by a lapped and partly by a butted weld.

Heretofore lapped ferrules have been made by drawing a chamfer on the two edges to be joined by various methods, all of which, in the main, are expensive, produce an uneven surface upon the edge, and are objectionable for the following reasons: There being nothing by which to gage the exact relative position of the chamfered portions, they are liable either to lap too far and make a depression when the overlapping portion reaches the contiguous portion of the ferrule, or by not lapping far enough to produce a corresponding depression; the diameter of the ferrule varying accordingly, and in either case being inaccurate; and, finally, a chamfer produced by removing the stock (the ordinary method) is expensive, inasmuch as one-half of the stock required to make the lap is wasted.

The advantages of my invention are: Perfect uniformity in exterior and interior surfaces; the combined strength of a lapped joint with the accuracy of a butted joint; perfect economy of metal, since the laps are drawn out, and the laps being placed at each end, where the liability to split is always greatest; that difficulty is thereby obviated. Ferrules made in accordance with my invention will not spring open in the fire while brazing.

In the accompanying drawing, Figure 1 is a blank as it leaves the tool for chamfering, and ready for welding or brazing. Fig. 2 is a similar blank, having its ends curved to form a straight end on a tapering ferrule; and Fig. 3 is a view of a tapering ferrule, with its joints united and ready for the brazing process.

A A represent the butted parts of the joint; B B B, the lapped portion. The blanks being formed, as shown in Figs. 1 and 2, with the lapped portions B B B beveled alternately—that is, any two bevels that meet in welding or brazing being beveled on the opposite face, and the butted portions A A being made perfectly straight—the blank is ready to be struck over a spindle or any appropriate device until the butted parts are in uniform contact the entire length of the spindle, whereby an accurate gage will be formed for welding the beveled laps or for brazing both butts and laps, and thus a perfectly uniform interior surface of the ferrule will be established. The exterior surface being equally uniform the brazing is more perfectly and cheaply performed.

Ordinarily I place a lap at each end of the ferrule, those being the parts most liable to split; but, manifestly, my invention is not limited to any particular location, either of the laps or the butts, but consists in using both on the same ferrule, the function of the butts being chiefly to gage, and that of the laps to weld, the joint. The butts, however, may also be united by brazing.

I therefore claim—

1. A ferrule, in which the edges of the blank are united partly by a lap and partly by a butt weld.

2. A ferrule in which the ends of the joint are formed by lap-welding, while intermediate parts are formed by butt-welding, substantially as and for the purpose set forth.

SILAS E. JERALDS.

Witnesses:
EDWARD A. CORNWALL,
JOHN H. TYACK.